Sept. 14, 1965  R. K. C. JOHNS  3,206,605
OBJECT LOCATION SYSTEM

Filed Feb. 23, 1961  7 Sheets-Sheet 1

FIG. 1

ROMAN K.C. JOHNS
INVENTOR.

BY Morse & Altman

ATTORNEYS

Sept. 14, 1965        R. K. C. JOHNS        3,206,605
OBJECT LOCATION SYSTEM

Filed Feb. 23, 1961        7 Sheets-Sheet 2

ROMAN K.C. JOHNS
INVENTOR.

BY Morse & Altman

ATTORNEYS

Sept. 14, 1965  R. K. C. JOHNS  3,206,605
OBJECT LOCATION SYSTEM
Filed Feb. 23, 1961  7 Sheets-Sheet 3

ROMAN K.C. JOHNS
INVENTOR.

BY Morse & Altman
ATTORNEYS

Sept. 14, 1965  R. K. C. JOHNS  3,206,605
OBJECT LOCATION SYSTEM
Filed Feb. 23, 1961  7 Sheets-Sheet 6

FIG. 7

ROMAN K.C. JOHNS
INVENTOR.

BY Morse & Altman
ATTORNEYS

Sept. 14, 1965  R. K. C. JOHNS  3,206,605
OBJECT LOCATION SYSTEM
Filed Feb. 23, 1961  7 Sheets-Sheet 7

ROMAN K.C. JOHNS
INVENTOR.

BY Morse & Altman

ATTORNEYS

United States Patent Office

3,206,605
Patented Sept. 14, 1965

3,206,605
OBJECT LOCATION SYSTEM
Roman K. C. Johns, Winchester, Mass., assignor to Baird-Atomic, Inc., Cambridge, Mass., a corporation of Massachusetts
Filed Feb. 23, 1961, Ser. No. 91,194
4 Claims. (Cl. 250—203)

The present invention relates to the art of object location and more particularly is directed towards a novel method and system for the location and tracking of remote objects. More especially the invention relates to systems and methods for the location and tracking of extra planetary objects such as orbiting satellite bodies.

Radio devices of various types utilizing the radio frequency section of the electro-magnetic radiation spectrum are used for the purpose of locating and tracking objects in space and determining their orbits. While such devices have the advantage of being operable throughout the day, i.e., for twenty-four hours a day, in the present state of the art such systems are inherently incapable of providing the degree of consistent accuracy necessary for certain applications.

In geodetic and astronomic work, a consistent accuracy of one to two seconds (1–2″) of arc is required. This requirement implies the use of at least supplementary optical tracking devices that are operable twenty-four hours a day to enable continuous calibration of radio devices while the object is in orbit. In order to assure such continuous calibration with an active satellite system, it is necessary to transmit light signals from the satellite day and night. It will be apparent that the limitations on power generation at the satellite makes such continuous signal emission impractical.

Optical tracking may be accomplished passively by using reflected sun light from the satellite body eliminating the requirement for a power supply at the satellite. Unhappily such a system is limited to operation during the period of twilight. In the daytime the noise level is too high and of course at night the sun is not reliably available. Another method available involves an active optical tracking system with pulsed light signals emitted from the satellite. Even an active system of this character, however, is not useful in the daytime because of the high noise level and limited power available. The operation of an active pulsed light emission system is essentially limited to use only during the earth's shadow or at night. An active system of this character really requires a significant power supply to maintain a flashing light in operation. In contrast with the above the present invention utilizes reference light sources from a remote reference source as, for example, a ground beacon search light having a beam width of the order of one degree.

The present invention differs from the prior art in effecting measurements of the angle between the directions of a pair of reference sources at the satellite. In the prior art angle measurements are normally made from the earth. Such measurements are subject to distortion from atmospheric refraction resulting in substantial errors in the apparent angle measured. In accordance with the principles of the present invention, at the satellite direction angles can be measured with substantially reduced errors due to atmospheric refraction. For normal triangulation techniques, at least two angle measurements from earth for each pair of beacons are required. In contrast, a single measurement effected at the satellite obviates the requirement for two separate angle measurements. Furthermore, for extreme accuracy, such measurements are incapable of being made simultaneously. Since the present invention reduces by at least one-half the number of simultaneous angle measurements required, timing errors are reduced and time coincidence assured.

Because the angle between the directions of the reference sources are measured directly at the satellite, only approximate stabilization is required in contrast with the prior art system wherein a high degree of such stabilization at the satellite is a necessity.

Where the angle measurements are made on earth, timing errors relating to transmission delays and the inability to coincide the measurement with true time at the satellite introduce further errors. In contradistinction the present invention contemplates a simple angle measurement effective at the satellite. Since a time indicator is carried at the satellite timing errors are substantially eliminated or at least reduced to the limits of modern time measurement accuracy.

The tracking system of the present invention, again in contrast with prior art optical systems, is useful twenty-four hours a day. While the use of the visible light section of the electro-magnetic radiation frequency spectrum is contemplated herein, signal to noise ratio in the present system is substantially enhanced by the use of sharply selected frequencies, e.g., monochromatic light, and modulation of the transmitted light, e.g., interrupting the light signals in a desired pattern.

Thus the system of the present invention realizes the full advantage of transmitting signals from the ground where unlimited power supply capability is available. The signal to noise ratio is substantially enhanced at the satellite in the light of power, frequency, and modulation or coding discrimination at the satellite. Angle measurements and time indications are taken at the satellite to provide a system which optimizes ground support and satellite equipment.

It is, therefore, an object of the invention to provide an improved object tracking system providing a high degree of accuracy.

It is a further object of the invention to provide an improved tracking system for producing indications of object position with high accuracy.

Yet another object of the invention is to provide an improved tracking system providing indications of the time at which measurements are taken with improved accuracy.

Still another object of the invention is to provide an improved tracking system capable of simultaneously providing an angle measurement relating to the positions of a pair of reference sources.

A still further object of the invention is to provide an improved tracking system capable of producing position indications with a high degree of structural simplicity.

A further object of the invention is to provide an improved tracking system exhibiting reduced errors due to atmospheric conditions.

A still further object of the invention is to provide an improved tracking system requiring no tracking signal power supply at the object.

Still another object of the invention is to provide an improved satellite body tracking system wherein a lesser degree of stabilization of the satellite body is required while providing improved accuracy in measurement.

Yet another object of the invention is to provide a satellite body tracking system exhibiting an improved signal-to-noise ratio for the tracking signal at the satellite body.

A further object of the invention is to provide an improved satellite body tracking system that is continuously operable.

In accordance with the invention there is provided a tracking system. The tracking system includes an object to be tracked. A further direction-sensing means is coupled to the object for sensing the direction of a first remote reference source in response to its signal. A second direction sensing means is coupled to the object for sensing the direction of a second reference source in response to its signal. The first and second sources are spaced a predetermined distance apart. Angle means are coupled to the first and second direction-sensing means for measuring the angle between the direction of the first and second reference sources to provide an indication of a selected position-characteristic of the object.

In one form of the invention a satellite tracking system is provided for a satellite body in motion in an orbit in space. Direction-sensing means are carried by the body.

In another form of the invention an optical direction-sensing means is used as, e.g., a telescope.

In one embodiment of the invention a time-indicating means is coupled to the object to provide an indication of time at which the angle is measured.

In another embodiment of the invention data transmission means are coupled to the angle means for transmitting angle data to a data processing means.

In still another embodiment of the invention the radiant signal from a remote reference source is radiated at a selected frequency to enable frequency discrimination of the signal.

In another form of the invention the tracking signal is modulated as, for example, by interrupting the signal in a predetermined or desired pattern.

In still another form of the invention orientation means are coupled to the direction-sensing means for aligning each of the direction-sensing means with its corresponding source reference. In operation, e.g., the orientation means may also respond to an error signal produced by non-alignment of the reference source and the direction-sensing means.

In accordance with one form of the invention three direction-sensing means are provided coupled to the object for sensing the directions of three reference sources in response to the respective signal of each source. The measurement of the three angles between the directions of each pair of reference sources completely defines the position of the object to be tracked.

In the preferred embodiment of the invention the angle means include electro-mechanical means coupled to the direction-sensing means for measuring the angle between the directions of the reference sources. The electro-mechanical means may be, e.g., a potentiometer or a shaft angle encoder.

Further in accordance with the invention is provided the method of providing a position indication of a body moving in space. In accordance with the method the directions of a plurality of remote reference sources are sensed from the body in response to a respective signal from each of the sources. The sources are spaced predetermined distances apart. The angle between the directions of a pair of sources is measured successively. The position-characteristic of the body is computed from the successive angle measurements in combination with selected data relating to the sources. In a modification of the method the angle between the directions of each of a plurality of pairs of reference sources are measured. The position-characteristic of a body is then computed from the angle measurements in combination with selected data relating to the sources.

For a better understanding of the present invention, together with other and further objects thereof, reference is made to the following description taken in connection with the accompanying drawings and its scope will be pointed out in the appended claims.

In general the present invention comprises a novel method and apparatus for locating precisely the position of an artificial satellite with respect to an orbital body.

In a preferred embodiment of the invention the orbited body, the earth for example, is provided with at least a pair of spaced beacons and preferably networks of beacons distributed a predetermined distance apart about the earth generally along the satellite's orbital path. A team consisting of two or three beacons is adapted, by means of auxiliary tracking equipment, to follow the satellite and illuminate it with a narrow beam of monochromatic light. In accordance with the invention the satellite is equipped with a plurality of gimbaled light detecting devices each adapted to lock on and track separately a particular beacon that is being monitored. The angle between each detecting device is measured at a recorded point in time and this data sent to a data processing system, which may be located on earth and/or in the satellite and which is adapted to provide correcting signals to the detecting devices and provide the data for plotting the satellite's position.

Principles of operation

Figure 1:
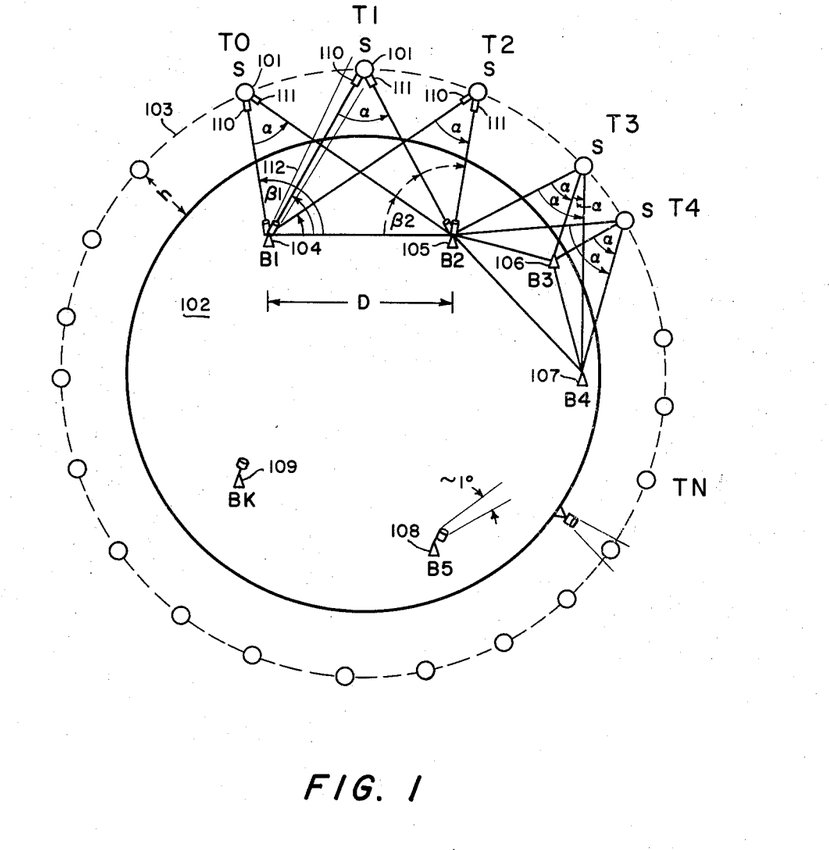
FIG. 1 is a schematic diagram of a satellite body tracking system embodying the invention and illustrating certain principles of the invention.

The principles of operation will now be discussed with reference to the drawings and with particular reference to FIGS. 1 and 2. As shown in FIG. 1 a satellite 101 is in motion around the earth, generally indicated at 102, in an orbit 103 indicated by a dashed line. A plurality of reference sources or ground beacons 104, 105, 106, 107, 108 and 109 are shown. The beacons are also indicated as $B_1$, $B_2$, $B_3$, $B_4$, $B_5$, . . . $B_n$. The actual number of beacons in use are chosen in such a manner as to provide continuous illumination of the satellite 101. The satellite, as shown, is indicated for its position at various times $T_0$, $T_1$, $T_2$, $T_3$, $T_4$, . . . $T_n$. A pair of direction-sensing means 110 and 111 are shown coupled to the satellite in the positions relating to times $T_0$, $T_1$ and $T_2$. The beacons $B_1$, $B_2$, etc. provide a tracking signal beam 112 to illuminate the satellite. For each position at the satellite 101 at least one triangle is determined between it and a pair of reference sources. As shown, a pair of reference sources, e.g., $B_1$ and $B_2$ provide a base line of known length, i.e., the reference sources are spaced a predetermined distance apart. The distance D between the sources 104 and 105, for example, may be 1000 or 1200 miles. The angles $\beta_1$ and $\beta_2$ are the direction angles measured from the base line $B_1$–$B_2$ to the satellite 101 for the beacons $B_1$ and $B_2$ respectively. The angle $\alpha$ is the angle as measured from the satellite of the direction lines to a pair of sources.

In accordance with the principles of triangulation a point in a plane may be determined when the distance between two reference points is known and the direction angle from each of the reference points to a third point are known. In the past it has been considered essential to utilize this basic information to determine the position of the satellite in a known orbit at a given time. Ordinarily the plane of the orbit is known or predetermined at the time the tracking problem arises. When, however, it is desired to define the location of the satellite at a given time with respect to an orbit which has been predetermined within a given degree of tolerance, angle $\alpha$ adequately and uniquely defines the satellite position. The measurement of the angle $\alpha$ can be obtained at the satellite 101 by the use of direction-sensing means 110 and 111. In the optical situation such direction sensing means may be a pair of telescopes so gimballed as to permit independent orientation or positioning of each telescope in alignment with the direction of a reference signal source such as a beacon signal light. The beacon 104, 105, etc. may be a powerful searchlight providing a beam width of one-half to one degree. For tracking purposes the beacon, e.g., $B_1$ rotates the light beam through the angle $\beta_1$, to follow the satellite. The signal 112 derived from the beacon 104 broadly defines the location of the satellite 101 when the satellite is properly illuminated.

As will be more completely discussed below, the orientation of the beacon relative to the satellite provides direction data which is telemetered to the satellite and commands a direction-sensing means to align itself with that beacon. Once the direction-sensing means and corresponding reference sources are in alignment, tracking is accomplished by controlling the respective motions of the reference source and its corresponding direction-sensing means to maintain alignment.

A single measurement of the angle $\alpha$ at a given time presents an indication of a selected position-characteristic of the satellite at that time. By taking successsive measurements in time it is then possible to determine precisely the character of the orbit. It will be apparent from the above that a single measurement of the angle $\alpha$ is much to be preferred over two separate measurements of direction angles taken from each beacon. The precise time coincidence of measurement, e.g., of $\beta_1$ and $\beta_2$, relating to beacons $B_1$ and $B_2$ respectively, is impossible, whereas time coincidence of the measurement of angle $\alpha$ is inherent since only a single measurement is involved. A single measurement of angle $\alpha$ defines the satellite position uniquely with respect to a known orbit. Successive measurements of angle $\alpha$ provide adequate information for an accurate description of a particular orbit.

As the satellite moves along its orbit the particular sources chosen for tracking change. The telescope 110, e.g., may be aligned with $B_1$, then with $B_2$, $B_3$, $B_4$ etc. in a given locale, the satellite may use two of a number of available sources. At times $T_3$ and $T_4$, the satellite may use $B_2$ and $B_3$ or $B_2$ and $B_4$ or $B_3$ and $B_4$.

Figure 2:
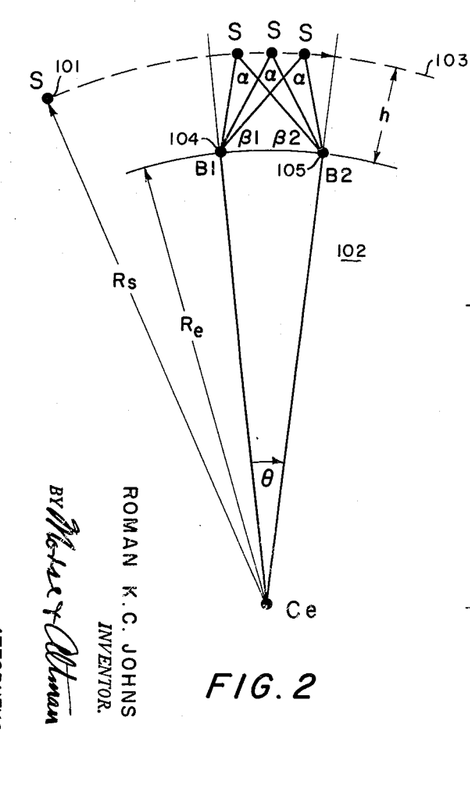
FIG. 2 is a schematic diagram of a part of the system in FIG. 1 and illustrates a further aspect of the principles of the invention.

Referring now to FIG. 2 there is here presented a diagram illustrating the planar case for a portion of the motion of the satellite 101. In FIG. 2, $R_s$ is the geocentric satellite radius; $R_e$ is the radius of the earth 102; angles $\beta_1$ and $\beta_2$ are the same as in FIG. 1, angle $\theta$ is the angle between geocentric radii of the beacons $B_1$ and $B_2$; $C_e$ is the earth's center; and $h$ is the satellite height above the earth's surface. For angle $\alpha$ varying from approximately 40° to 60°, angle $\theta$ is approximately 16° of arc, $\beta_1$ varies from approximately 100° to 40° and $\beta_2$ varies from approximately 40° to 100°. The angle $\alpha$ reaches a maximum when the satellite is equidistant from the beacons $B_1$ and $B_2$. In the extreme case angle $\alpha$ becomes 0 when the satellite and beacons are colinear. The difference between the beacon direction angles, $\beta_1 - \beta_2$, is inversely proportional to the angle $\alpha$.

It would appear from, e.g., the law of sines, knowing one side and an opposite angle is insufficient unambiguously to describe a unique triangle. A moving body, however, generates other curves providing useful data.

If, e.g., the angle $\alpha$ were a constant, motion of the satellite would generate a curve relative to $B_1$ and $B_2$ which is unique. For each such $\alpha$ another curve would be generated.

Thus, when successive measurements are taken with respect to time, the necessary data is produced uniquely to define the satellite position.

Figure 2A:
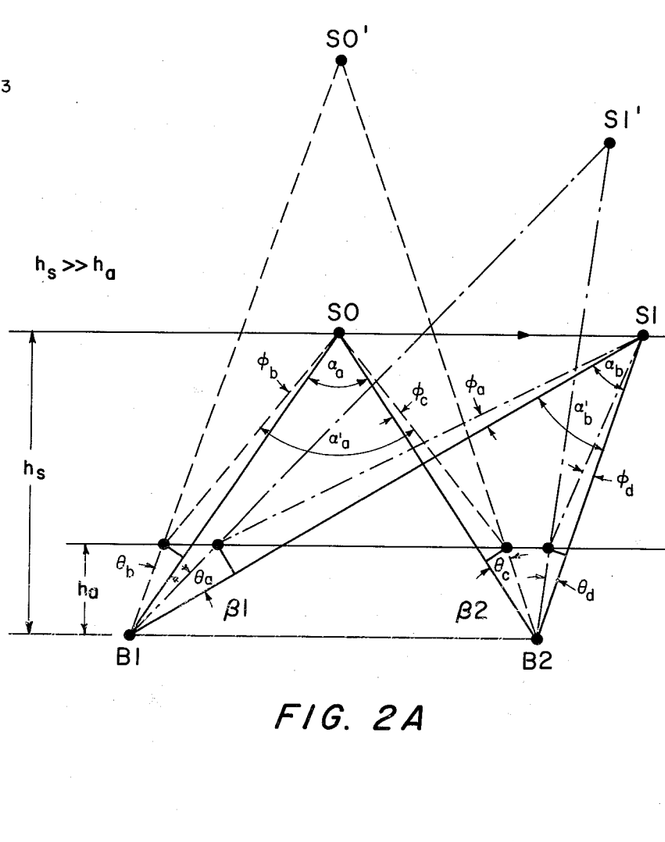
FIG. 2A is schematic diagram illustrating another aspect of the principles of the invention.

Referring now to FIG. 2A, there is here presented a schematic diagram illustrating the difference in the apparent error of the beacon direction angle as observed from earth as opposed to the apparent error viewed from the satellite S.

In FIG. 2A triangles $S_0$, $B_1$, $B_2$ and $S_1$, $B_1$, $B_2$ present the true positions of the satellite and beacons and the direction lines between them. The triangles $S_0'$, $B_1$, $B_2$ and $S_1'$, $B_1$, $B_2$ present the apparent positions and direction lines when observed from the ground.

The angles $\theta_b$ and $\theta_c$ illustrate the apparent incremental errors in direction angles associated with satellite position $S_0$ as observed from the beacon stations $B_1$ and $B_2$ respectively. The angles $\phi_b$ and $\phi_c$ illustrate the corresponding apparent incremental errors as observed from the satellite $S_0$. The angle $\alpha_a$ is the true angle between the beacon directions from the satellite $S_0$; the angle $\alpha_a'$ is the apparent angle observed at the satellite. For the position $S_1$ and apparent position $S_1'$ the corresponding angles are $\theta_a$, $\theta_b$, $\phi_a$, $\phi_b$, $\alpha_b$ and $\alpha_b'$.

Although the portions are not accurate as drawn, the reason that the angular measurement from the satellite is subject to less error than that measured from the ground will be apparent from FIG. 2A. The height $h_a$ of the atmosphere wherein effective refraction takes place is considered to be 50 miles. For a 1000 mile satellite $h_s$ the distance that the signal travels in an unrefracting environment is 950 miles; that is, the height of the satellite above the atmosphere is 950 miles. Thus the error angle $\phi$ subtended with respect to the satellite is extremely small relative to that angle subtended with respect to a ground beacon. It turns out that for $\theta$ in the order of 100″ of arc, $\phi$ is only 2.5″ of arc.

The error in $\alpha$ for $S_0$ is only 5″ whereas the error in $\beta_1$ and $\beta_2$ additively is 200″ of arc.

Moreover, for $S_1$, where $B_2 > 90°$, the very character of the measurement of the angle $\alpha$ substantially reduces even this small error. The true angle $\alpha_b$, as shown, differs from the apparent angle $\alpha_b'$ very little since the measurement compensate for the errors to a large degree; the net error $\alpha_b' - \alpha_b$, being $|\phi_a - \phi_b|$. Conversely the errors measured from the ground are additive. Thus, in triangle $S_1'B_1B_2$ the apparent satellite position $S_1'$ is very different from its true position indicated at $S_1$.

For purposes of illustration, the curvature of the earth and atmosphere are ignored herein.

Figure 3:
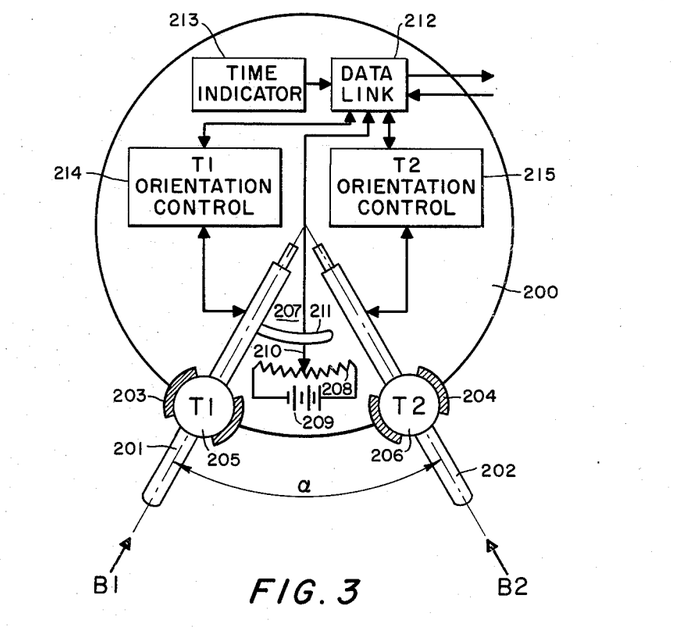
FIG. 3 is a schematic diagram of a satellite body embodying the tracking system of the invention.

*Description and operation of the tracking system in FIG. 3*

Referring now to FIG. 3 there is here illustrated a satellite tracking system embodying the invention. A satellite body 200 supports a pair of telescopes 201 and 202. The telescopes are aligned as shown with a pair of reference sources of optical signals $B_1$ and $B_2$. The telescopes are spherically gimbaled with a pair of spherical supports 203 and 204 which mate with spherical mounts 205 and 206 respectively. So gimbaled the telescopes may be rotated arcuately about a pair of orthogonal axes $x$—$x'$ and $y$—$y'$ (FIG. 6) for astronomical azimuth and inclination positioning. The two degrees of freedom thus provided by the spherical gimbaling may, as is well known in the art, be supplied by other suitable axis support devices, such as yoke and axle devices. The mechanical means for engaging the telescopes for alignment purposes is not shown. The measurement of the angle $\alpha$ is obtained electro-mechanically with a potentiometer generally indicated at 207. The potentiometer circuit comprises a stator resistor 208, a source of power 209, here indicated as a battery direct current supply, and a movable connection tap 210 coupled to a mechanical positioning arm 211. The voltage along the resistor 208 varies in proportion to the angle $\alpha$.

The arm 211 is connected to the telescope 201 and moves arcuately. The movable tap 210 provides an electrical connection to a data link 212 which transmits the information to a data processing center, e.g., on earth. The time at which the measurement is taken is provided with a time indicator 213 which is coupled to the data link 212. The data link both transmits and receives data for control and processing purposes. As shown the data link is coupled to an orientation control 214 and a second orientation control 215 which are in turn coupled to the telescopes $T_1$ and $T_2$ respectively.

Broadly the direction angle of the satellite as determined by the angular positions of the beacons in the ground reference station and this information is transmitted by the data link 212 to the orientation control 214 for $T_1$ which in turn aligns the telescope $T_1$ with the ground beacon $B_1$. Similarly a command signal from the ground beacon $B_2$ is transmitted through data link 212 to the orientation control 215 which is coupled to the telescope $T_2$ for alignment thereof.

Figure 4:
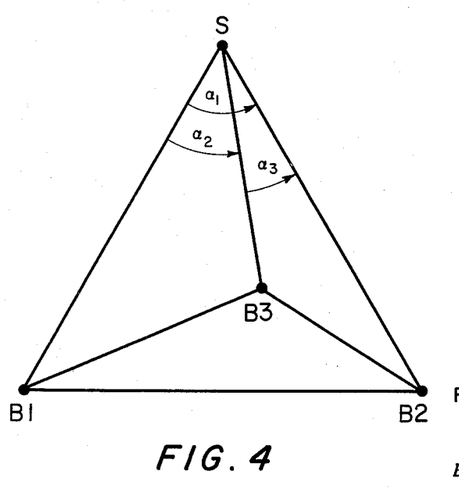
FIG. 4 is a schematic diagram illustrating a modification of the system in FIG. 1.

*Description and operation of the tracking system in FIG. 4*

A tetrahedron is fully described by its base lines and apex angles. Since the beacons are prelocated and spaced predetermined distances apart, the base lines $B_1B_2$, $B_1B_3$ and $B_2B_3$ are known. The apex angles $\alpha_1$, $\alpha_2$ and $\alpha_3$ are measured at the satellite to fulfill the required information for explicitly determining the position of the satellite S.

Referring now to FIG. 4 there is here illustrated a schematic diagram of a tracking system involving the use of more than two ground reference sources or beacon stations. Three reference sources $B_1$, $B_2$ and $B_3$ are provided for use in aligning the position of the satellite S. Here the concept of the intersection of three planes is utilized to provide full position information by measurements simultaneously made in time. Thus the angle $\alpha_1$ between $B_1$ and $B_2$ provides an indication of the position-characteristic of the satellite in the plane defined by triangle $SB_1B_2$. In like manner angle $\alpha_2$ provides a position indication of the satellite in the plane $SB_1B_3$ and the angle $\alpha_3$ provides a position indication of the satellite in the plane $SB_2B_3$.

It will be apparent from the above that the satellite together with the beacon station $B_1$, $B_2$, and $B_3$ present a system of intersection points describing a tetrahedron. The intersection of the planes of the tetrahedron, common apex of the three triangles, occurs at the position of the satellite. Here again the measurement is made at the satellite of the angle between the directions of the beacons. Here we see that three angles measurements provide the necessary data as to the position of the satellite as opposed to six as would otherwise be required from the ground.

Figure 5:
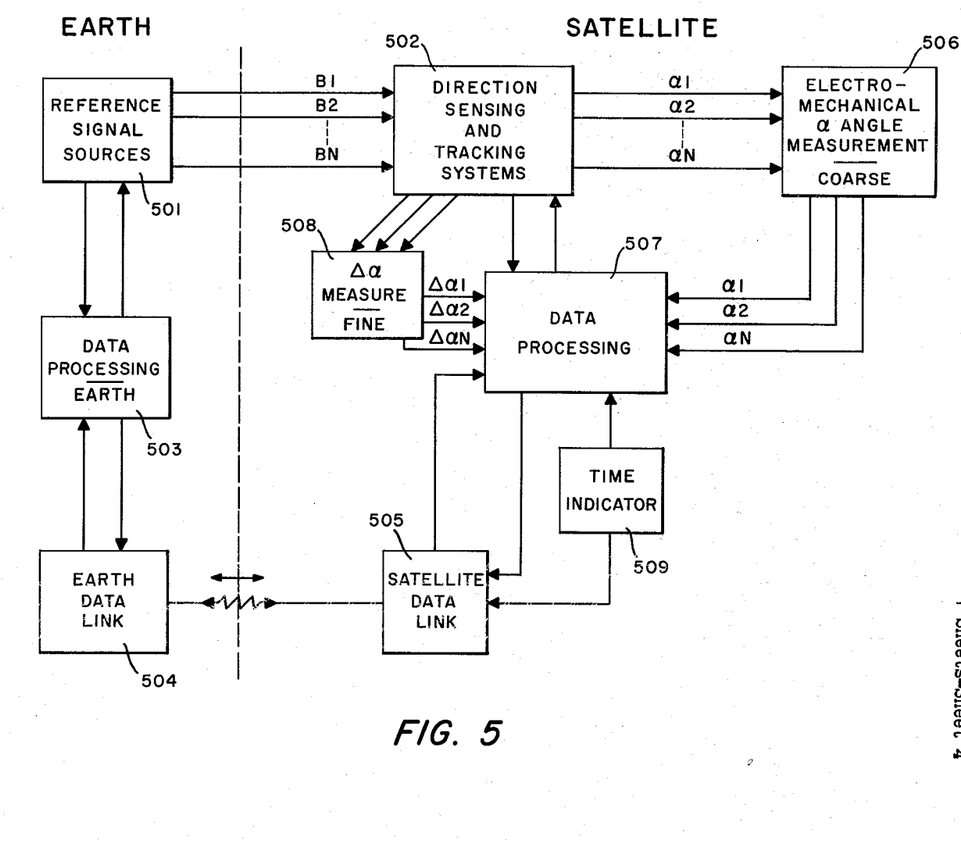
FIG. 5 is a schematic block diagram broadly illustrating a satellite tracking system embodying the invention.

*Description and operation of the tracking system in FIG. 5*

Referring now to FIG. 5 there is here broadly illustrated a complete system for satellite tracking and control with its supporting data links. The devices located on earth are shown to the left of the dotted line; those devices carried by the satellite are shown to the right of the dotted line. Reference signal sources which are the beacons on earth are directed toward the satellite and coupled through the direction-sensing means including the telescopes and the satellite tracking system. Data as to the direction angles (e.g. $\beta$) of the reference signal sources on earth are coupled to a data processing means located on the earth. The data processing means is in turn coupled to a data link. Radio or other radiation communication is established between the data link on earth and a data link carried by the satellite. Measurements of the angle $\alpha$ at the satellite between the directions of a pair of reference electro-magnetic signal sources such as beams from the beacons $B_1$, $B_2$ are coarsely made electro-mechanically. Data as to the position of the direction-sensing means at the satellite and the angle $\alpha$ measurements are transmitted to a data processing means carried by the satellite.

Thus a system of reference signal sources 501 represents singals from beacons $B_1$, $B_2$, . . . $B_n$ to a direction-sensing and tracking system 502 carried by the satellite. The signal sources are coupled to a data processing means 503 located on earth. The earth data processing means is in turn coupled to an earth data link 504 in communication with a satellite data link 505. Data is transmitted and received by both data links 504 and 505. The coarse measurement of the angle $\alpha$ is provided by an electro-mechanical angle measurement means 506 such as the potentiometer circuit of FIG. 3. The coarse angle measurement means is coupled to a data processing means 507 carried by the satellite. The direction-sensing and tracking system is coupled to a fine measurement means 508 for $\Delta\alpha$ which is in turn coupled to the data processing means 507. Time indicator 509 is coupled to the data processing means 507 and the satellite data link 505.

As the satellite moves in its orbit, individual beacon sations $B_1$, $B_2$ . . . $B_n$ provide optical signals which are received by the direction-sensing and tracking system at the satellite. The direction-sensing system may align itself with the individual beacons by virtue of a beam sensing mechanism carried by the satellite which automatically centers the direction-sensing means with respect to the signal from the reference signal source. Because of frequent requirement for extreme accuracy, a mechanism for accurately measuring the angle $\alpha$ is required. The electro-mechanical means 506 may be adequate for measuring the angle $\alpha$ within an accuracy, e.g., in the order of minutes of arc. However, when accuracies in the order of seconds of arc are required, an additional essentially micrometer measurement device is required offering an expanded base.

Figure 6:
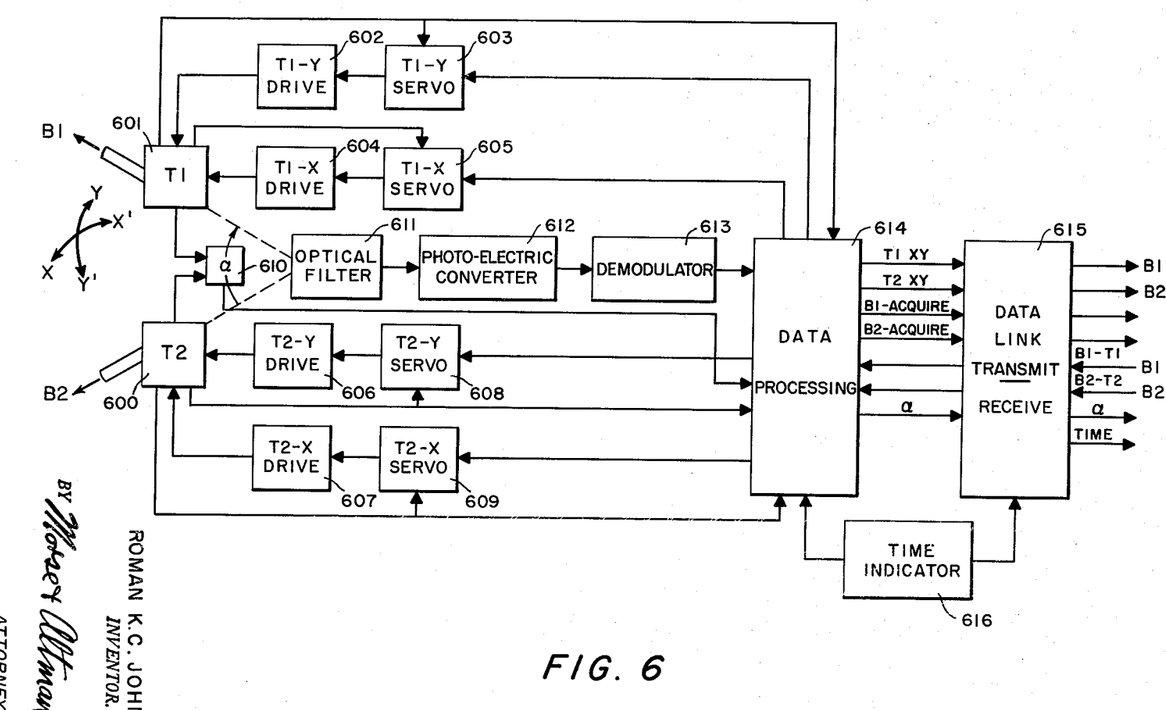
FIG. 6 is a detailed block diagram illustrating a preferred embodiment of the invention.

*Description and operation of the tracking system in FIG. 6*

Referring now to FIG. 6, there is here illustrated a detailed schematic block diagram of a satellite tracking system carried by the satellite designed for use with a pair of telescopes cooperating with a pair of reference sources located at the ground. The system as here illustrated generally presents a pair of telescopes, a position orientation system for each of the telescopes and an optical signal receiving and processing system. As shown a data processing means and data link transmitting and receiving means are coupled to a time indicator for providing an indication of time at which data is processed or received or transmitted.

Thus a first-direction-sensing means or optical telescope 601, here indicated as $T_1$, is coupled to a Y axis drive means 602 which in turn is coupled to a Y axis servo 603. An X axis drive means 604 is coupled to the scope 601 and an X axis servo 605 is coupled to the drive means 604. A second direction-sensing means, a telescope 600 here alternately indicated as $T_2$, is coupled to a Y axis drive means 606 and X axis drive means 607. The drive means 606 is coupled to a Y axis servo control 608 and the drive means 607 is coupled to an X axis servo control means 609 for the telescope $T_2$. Both telescopes are coupled to $\alpha$ measurement means 610. The telescopes 601 and 600 are optically coupled to a photoelectric processing system involving an optical filter means 611, coupled to a photoelectric converter 612 which is in turn coupled to a demodulator 613. The telescopes, the servos, the measurement means and the demodulator are all coupled to a data processing means 614 which is in turn coupled to a data link means 615, time indicator means 616 coupled to the data processing and data link means 614 and 615.

The operation of the direction-sensing orientation control system will be described with particular reference to the $T_1$ telescope system. A ground reference source or optical beacon station $B_1$ directs a light beam at the satellite. At the same time instructions from the reference station $B_1$ are communicated via the satellite data link 615 and data processing means 614 to provide initial X and Y axes orientation data. Since the actual satellite position orientation of $T_1$ is stored in the data processing means 614, a command signal from the ground station is compared in means 614 with the position of the telescope. An error signal is produced providing specific orientation instructions for the X and Y axes. An error in the Y axis is coupled from the data processing means 614 to the $T_1$ Y axis servo 603 which in turn controls the $T_1$ Y axes drive mechanism to control the axes position of the scope $T_1$. The orientation of the telescope $T_1$ is independently controllable by rotating the telescope along orthogonal arcuately reference curves about the X and Y axes. The telescope $T_1$ thus has two degrees of freedom to enable its alignment with the signal emitted by a ground reference station. The alignment of the telescope $T_1$ may be independently tracked. A discrepancy between the actual orientation of $T_1$ is compared with data from $B_1$ as to its XY orientation. Any resulting error signal will appear in the data processing means 614. Alternatively, by using a beam center sensing device carried by the satellite and operative to produce an error signal when $T_1$ is misaligned with respect to the center of the beam, $T_1$ can be caused to track the beam from $B_1$ automatically.

In a similar manner the orientation control system coupled to the second telescope $T_2$ or 600 operates to position it with respect to a pair of orthogonal XY axes to provide it with two degrees of freedom. Thus an error signal emanating from the data processing means 614 may applied to the $T_2$ Y axis servo 608 and coupled to the $T_2$ Y axis drive mechanism which orient the telescope $T_2$ with the respect to the Y axis. Orientation along an orthogonal X axis is produced by an error signal emanating from the data processing means 614 and coupled to the $T_2$ X axis servo 609, the servo is coupled to the $T_2$ X axis drive mechanism 607 to control the X axis position orientation of the telescope $T_2$. The drive means and the gimbaling of the telescope may assume any number of well known mechanical arrangements. They may be coupled for example by a combination of azimuth and inclination yoke and axle couplings to provide the two degrees of freedom. Positioning may be accomplished by suitably gearing the XY axes axles or shafts to a drive motor.

Once the telescopes have been aligned with their corresponding reference sources the angle between them, angle $\alpha$, is measured to provide an indication of the position of the satellite. This measurement is typically made by a potentiometer device such as described above or a digital shaft encoder measurement device of the type manufactured by RCA. The fine measurement of alpha may be accomplished by electronic means utilizing a photoelectric converter such as a television camera.

In order to provide operation for twenty-four hours a day it is necessary to increase the apparent signal to noise ratio of the desired signal arising at the satellite. This problem is particularly intense during the daytime when the light emitted by the earth provides a very high noise background. The desired system for discrimination may take the form of frequency selection and modulation of a signal. Thus a choice of monochromatic light for the beacons as provided by a sodium arc lamp or a mercury arc lamp cuts down the area of the visible spectrum at which the satellite is illuminated. Furthermore, the light signal may be modulated by flashing the light at a suitable rate. At the satellite the light signals received by the telescopes $T_1$ and $T_2$ may be directed from an optical filter means 611 to a light direction sensitive photoelectric converter 612. The position of the point of impingement of the directed light signal provides a mechanism for measuring the angle alpha. This mechanism for example could involve a reference XY axis and a requirement that the points of impingement maintain a certain relationship with, e.g., an arbitrary axis. It is possible to superimpose the light signals and require a nulling effect. Any deviation from the null would indicate a misalignment with the beacon stations which provides an error signal to correct the appropriate telescope.

Light energy applied to a photoelectric converter provides an indication of a presence of a true signal as well as the mechanism for converting the data in the light signal into an electrical form for use for control purposes. Thus a signal of monochromatic light passing through the filter 611 is converted by the converter 612 into an intermediate frequency electrical signal which can be demodulated to provide an indication of the character of the signal.

The system as shown does not incorporate Doppler frequency discrimination.

An intermediate frequency signal obtained by e.g. heterodyning a reference signal, not shown, with the converted optical signal may be coupled to the data processing means 614 to be compared with stored reference data indicating the presence or lack of presence of a signal. Given an indication of a true signal received, the tracking system upon command from the data processing means locks on the corresponding beacon, e.g., $B_1$ and tracks it continuously. At the same time the indication of acquisition of $B_1$ is transmitted by the data link 615 to the ground data link system and there introduced to a central data processing center such as indicated above with reference to FIG. 5. The time indicator means 616, which may be an extremely accurate mechanism such as an atomic clock, provides time indications to the data processing means 614 and the data link 615. All data with respect to position or orientation or acquisition is thus referenced in time by means of a self contained time indicator.

The data processing means 614 receives, processes and stores data with respect to the orientation of the telescopes, the measurement of angle $\alpha$ and time as well as the characteristics of the optical signal received at the satellite. The extent of data processing accomplished at the satellite is determined by optimizing available data transmission bandwidth relative to complexity of mechanization required at the satellite. In any case, data as to the orientation of the telescopes with respect to the XY axes, the acquisition of the beacon station, the time indications, and the angle $\alpha$ measurements may be transmitted via the data link 615 to a ground central data processing center.

The servo systems used for positioning the telescopes include a feed back loop from the telescopes as to their position with references to the XY axes. This information is relayed back to the servo controls 603, 605, 608, 609 in accordance with well known feed back techniques.

Figure 7:
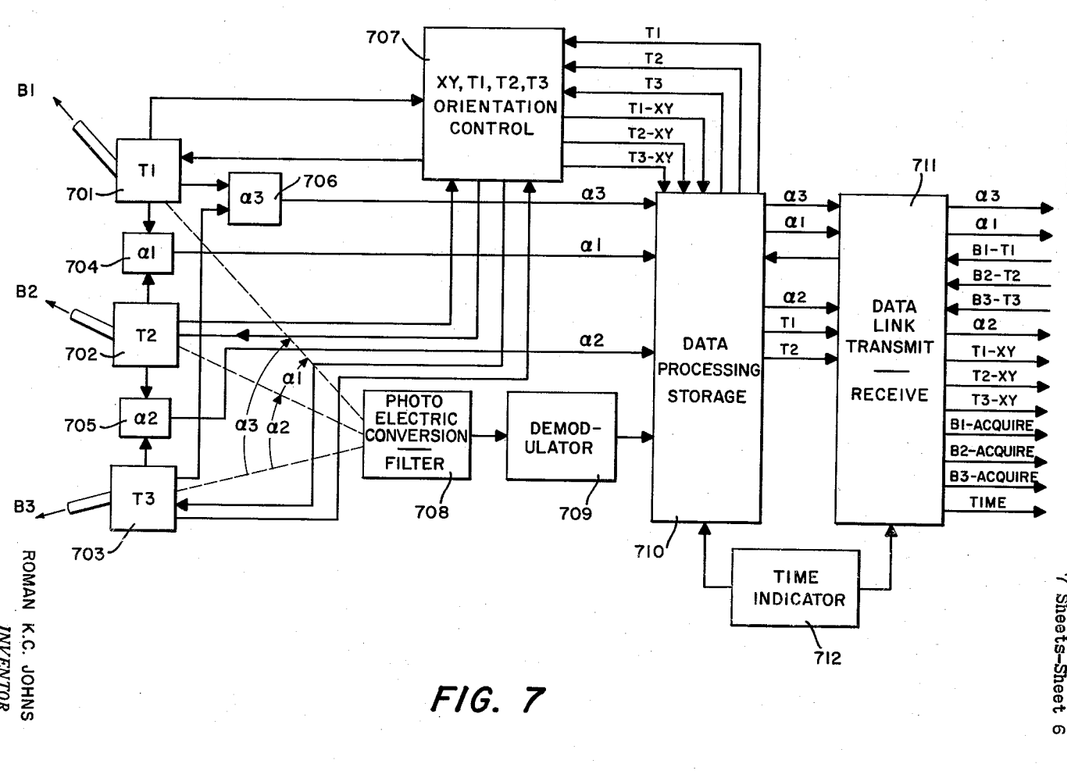
FIG. 7 is a schematic block diagram illustrating a modification of the tracking system in FIG. 6.

*Description and operation of the tracking system in FIG. 7*

Referring now to FIG. 7 there is here illustrated a tracking system carried by the satellite for use in conjunction with a modified tracking system such as that illustrated diagrammatically in FIG. 4. As shown herein three telescopes are used corresponding with three beacon stations on earth $B_1$, $B_2$, and $B_3$. A system is provided for measuring the three angles between the directions of each pair of beacon stations. The optical signals are directed by telescopes to a photoelectric conversion and filter means and demodulated data storage system. An orientation control system for XY positioning of the telescopes $T_1$, $T_2$, and $T_3$ is coupled with a data processing system, which, in turn, is coupled to a data link system for transmitting and receiving appropriate information.

Thus there are three telescopes 701, 702, and 703 which are coupled in pairs as shown to three alpha angle measuring devices 704, 705, and 706. The alpha measurement devices present means for measuring the angle between the reference stations $B_1$ and $B_2$, $X_1$; the angle between reference stations $B_2$ and $B_3$, $X_3$; and the angle between the reference stations $B_1$ and $B_3$, $X_2$. The telescopes are coupled to an orientation control 707 which controls the orientation with respect to the X and Y axes of the telescopes $T_1$, $T_2$, and $T_3$ in a manner similar to that described with respect to FIG. 6. The telescopes are optically coupled to a phtoelectric converter and filter 708 which in turn is coupled to a demodulator 709. The photoelectric conversion system operates in a manner similar to that described with respect to FIG. 6. Demodulator 709, the telescopes and the orientation control devices, are all coupled to a data processing means 710 which is in turn coupled to a data link transmit and receive means 711. Again a time indicator means 712 is coupled to data link 711 and the data storage means 710. The system as presented in FIG. 7 is somewhat more complicated than in FIG. 6 in that three tracking systems are required for the telescopes plus two additional angle measuring devices for measuring the direction angles with respect to an additional reference beacon station. The function of computing the actual values of angles $X_1$, $X_2$ and $X_3$ may be accomplished either at the satellite or at a central data processing system on earth.

Figure 8:
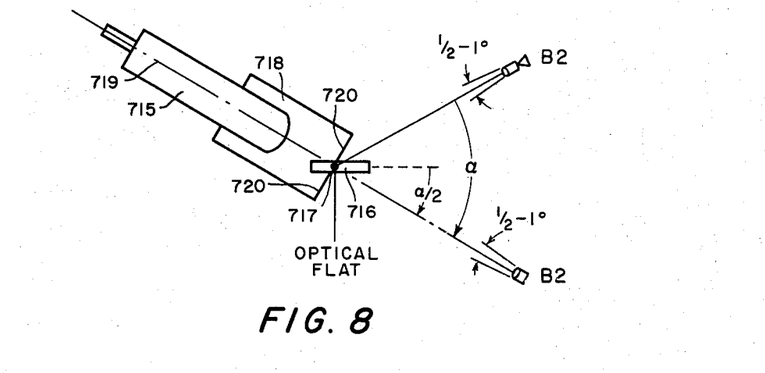
FIG. 8 is a side view of a direction-sensing means embodying the invention.

*Description and operation of a modified telescope in FIG. 8*

Referring now to FIG. 8 there is here illustrated a telescope modified for use in the present invention to avoid the requirement for two independently controlled telescopes. A telescope 715 is coupled to an optical flat 716 which is rotatable about a shaft or axle 717 providing an axis perpendicular to the plane of the drawing. Surrounding the telescope is a rotatable tube 718 which is rotatable about the optical axis 719 of the telescope. The tube 718 provides a rotatable support for a yoke 720 which supports the optical flat 716 at the opposite ends of its axis of rotation. The optical flat is carried by the hinge 717 in such a manner that it is rotatable about an axis extending through the hinge perpendicular to the plane of the drawing. It will be apparent that the combination of rotations thus available provides two degrees of freedom for the telescope.

In operation the telescope 717 is aligned with its respective source of signal e.g. a ground beacon station $B_1$ which directs an optical signal through the flat 716 along the optical axis of the telescope. A signal derived from a reference ground beacon $B_2$ arrives at a direction at an angle alpha with respect to the direction angle of the reference ground beacon $B_1$. It will be apparent that the axes through the hinge 717 and along the optical axis of the telescope are orthogonal. The rotation of the optical flat about the axis of the hinge 717 provides a measure of one-half of the angle alpha. This rotation can be correlated by means of a differential transformer, rotary potentiometer, digital shaft encoder or other electro-mechanical conversion device to produce an electric signal proportional to the angle $\alpha$.

An orientation control means may operate a servo positioning control coupled to the optical flat to position it in accordance with command instructions from its corresponding reference ground beacon $B_2$. The tube 718 is rotated about the optical axis to provide alignment of the optical signal $B_2$ with the telescope 715. Such an arrangement has a definite advantage over independently controlled telescopes in that optical errors produced by misalignments within the telescopes are eliminated. Here the signals from both beacons are directed through the same telescope. This also enables a ready null adjustment and greatly simplifies the structure required for direction-sensing. Here a single apparatus provides direction-sensing means for both beacons. This concept can of course be further enhanced with a third reflecting surface transparent-reflecting device which is oriented with respect to a third beacon.

Figure 9:
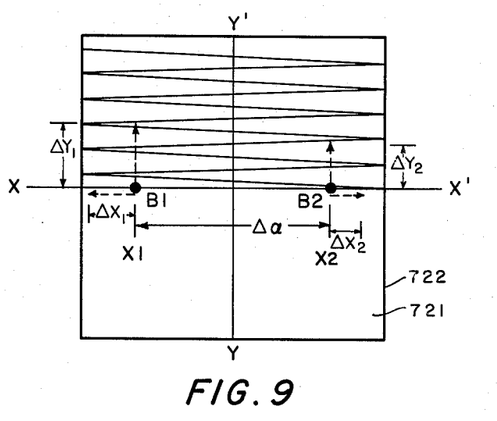
FIG. 9 is a face view of a camera used in accordance with the present invention.
Figure 10:
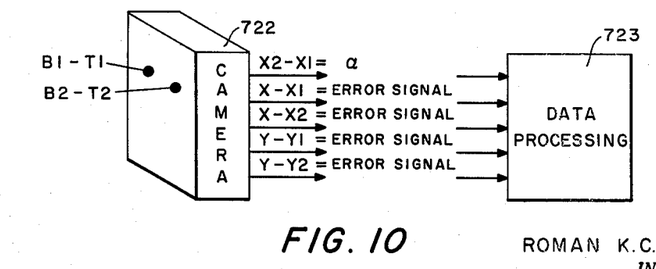
FIG. 10 is a partially schematic, perspective view of a camera used in accordance with the present invention.

*Description and operation of the camera illustrated in FIGS. 9 and 10*

Referring now to FIGS. 9 and 10 is here illustrated a television camera 722 useful for electronically measuring the angle $\alpha$ between the directions from the satellite of a pair of beacons. In accordance with well known television camera techniques the positions of optical signals received from reference ground stations $B_1$ and $B_2$ may be determined with respect to a predetermined system of reference X and Y axes. Here the principle of utilizing a relatively fast moving scanning electron beam to measure the distance between the received points provides an extremely fine measurement of the angle $\alpha$. This system is preferably used in conjunction with a coarse measuring device which is electro-mechanical in character. As shown in FIG. 9 a light signal representative of $B_1$ appears on a screen 721 in a very definite position with respect to a scanning beam. This position is located with respect to a pair of XY reference axes. The measurement is made when the two indications from the signals from $B_1$ and $B_2$ are linearly arranged on the X axis. The separation between the signal indications $B_1$ and $B_2$ represent the measurement of the angle $\Delta\alpha$. In addition, misalignment errors between the telescope $T_1$ and its corresponding ground reference beacon $B_1$ appear as displacements on the screen as $\Delta Y_1$ or $\Delta X_1$. Similarly misalignments of the telescope $T_2$ with its corresponding reference station $B_2$ appear on the screen as $\Delta X_2$ or $\Delta Y_2$. This information, as shown in FIG. 10, is relayed via a data processing means 723 to the appropriate orientation control to correct the misalignment. The distance $X_2-X_1$ of the indications of the beacon signals indeed provides a measure of the angle $\alpha$.

Motion of the $B_1$ signal with respect to reference $X_1$, when accompanied by a similar motion of the $B_2$ signal, produces an error signal for repositioning for both telescopes. When the telescope $T_1$ becomes misaligned with the beacon $B_1$ this information is stored in a data processing means. The exact amount of displacement can then be measured by the scanning beam in the television circuit.

The background interference encountered in tracking an object on the ground from the satellite consists of generally a brightness variation from the ground due to shadows and variations of reflectivity of ground objects. In some cases the contrast between these objects may be as much as 100 percent for certain wave length regions. The maximum brightness of the scene, e.g., bright sunlight may be derived from the solar constant, luminous efficiency of sunlight and the diffuse reflectivity of snow. It turns out to be approximately three lumens/cm.$^2$/steradian.

Maximum spacial discrimination may be realized when the discrimination pattern of the tracker is matched to the apparent size of the source. Thus the element size of the discrimination pattern is of the order of one second arc$^2$ or approximately $2.5 \times 10^{-11}$ steradian, the illuminance received from one element of maximum background of three lumens/cm.$^2$/steradian is a little less than $10^{-10}$ lumens/cm.$^2$ which is about that received from a first magnitude star.

The use of an electronic photoelectric converter for effecting the fine measurement of angle $\alpha$ greatly enhances the spacial discrimination of the beacon by virtue of the display presented. The beacons that may be used in conjunction with the above preferably utilize a carbon arc searchlight source working with a photo tube as a receiver. Although infra red detectors are useful for the present application, visible wave lengths yield greater intensity. A beacon which is useful comprises a five foot diameter searchlight with a beam width approximately one-half degree at about $10^8$ beam candle power. At 1000 miles such a source subtends an angular size less than one second of arc as seen from a satellite at 1000 miles. The source may be modulated in frequency at a suitable audio frequency. From the preliminary orbital data, the beam is directed continuously at the satellite. The apparent position of the searchlight and the telescopes field of view is accurately determined by a television scan device as described above. This position data is stored together with telescope gimbal position data. Simultaneously similar tracking data from other ground stations are stored. Resulting triangulation data, sufficient for an accurate determination of position by triangulation techniques, are transmitted to the ground after processing.

It will be apparent that the present invention greatly enhances the art of tracking of moving objects. The present invention has great application in the many areas where object location and position characteristics of moving objects are of interest.

While there have been described what are at present considered to be the preferred embodiments of the invention, it will be obvious to those skilled in the art that various changes and modifications may be made therein without departing from the invention, and it is, therefore, aimed in the appended claims to cover all such changes, modifications as follow in the true scope and spirit of the invention.

What is claimed is:

1. A system for locating an artificial satellite in orbit about a heavenly body, comprising a plurality of signal generating stations located in spaced measured relation on the surface of said body, at least a pair of signal sensing elements mounted to said satellite, said elements being angularly movable relative to one another, means for aligning each of said elements with separate ones of said stations, means located in said satellite for measuring the angle between said elements, means for converting said angle into electrical information and means for transmitting said information to said heavenly body.

2. A system for locating an artificial satellite in orbit about a heavenly body, comprising a plurality of light beam generating stations located in spaced measured relation on the surface of said body, at least a pair of beam sensing elements mounted to said satellite, said elements being angularly movable relative to one another, servo means for aligning each of said elements with separate ones of said stations, means located in said satellite for measuring the angle between said elements, analogue means for converting said angle into electrical information and telemetering means for transmitting said information to said heavenly body.

3. A system for locating an artificial satellite in orbit about a heavenly body, comprising a plurality of light beam generating stations located in spaced measured relation on the surface of said body, at least a pair of beam sensing elements mounted to said satellite, said elements being angularly movable relative to one another, servo means for precisely aligning each of said elements with separate ones of said stations, means located in said satellite for measuring the angle between said elements, analogue means for converting said angle into an electrical signal, timing means for indicating the time of angle measurement and means for transmitting said signal to said heavenly body.

4. A system for locating an artificial satellite in orbit about a heavenly body, comprising at least a pair of light beam generating stations located in spaced relation on the surface of said body, at least a pair of light beam sensing elements mounted to said satellite, said elements being angularly movable relative to one another, a servo loop for aligning each of said elements with separate ones of said stations, means located in said satellite for measuring the angle between said elements, analog means for converting said angle into an electrical signal, means for timing said measurement, telemetering means for transmitting said signal to said heavenly body, and means located on said heavenly body for receiving and decoding said signal.

References Cited by the Examiner

UNITED STATES PATENTS

| | | |
|---|---|---|
| 2,489,219 | 11/49 | Herbold. |
| 2,569,328 | 9/51 | Omberg. |
| 2,715,995 | 8/55 | Wirkler. |
| 2,982,958 | 5/61 | Yulo _____________ 343—112 X |

CHESTER L. JUSTUS, *Primary Examiner.*

FREDERICK M. STRADER, KATHLEEN CLAFFY, *Examiners.*